(12) United States Patent
Baskett

(10) Patent No.: US 12,111,136 B2
(45) Date of Patent: *Oct. 8, 2024

(54) SIGHT POST CAMERA FOR A FIREARM

(71) Applicant: James Baskett, Eloy, AZ (US)

(72) Inventor: James Baskett, Eloy, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/167,195

(22) Filed: Feb. 10, 2023

(65) Prior Publication Data

US 2023/0194210 A1    Jun. 22, 2023

Related U.S. Application Data

(63) Continuation of application No. 16/869,938, filed on May 8, 2020, now Pat. No. 11,566,871.

(60) Provisional application No. 62/924,994, filed on Oct. 23, 2019.

(51) Int. Cl.
| | |
|---|---|
| *F41G 11/00* | (2006.01) |
| *F41G 1/02* | (2006.01) |
| *G01S 19/13* | (2010.01) |
| *H04N 7/18* | (2006.01) |
| *H04N 23/54* | (2023.01) |
| *H04N 23/667* | (2023.01) |

(52) U.S. Cl.
CPC ............ *F41G 11/00* (2013.01); *F41G 1/02* (2013.01); *G01S 19/13* (2013.01); *H04N 7/183* (2013.01); *H04N 7/188* (2013.01); *H04N 23/54* (2023.01); *H04N 23/667* (2023.01)

(58) Field of Classification Search
None
See application file for complete search history.

(56) References Cited

U.S. PATENT DOCUMENTS

| | | | |
|---|---|---|---|
| 11,187,497 B2* | 11/2021 | Seznec-Serpaggi | ......................... G02B 27/0189 |
| 11,566,871 B2* | 1/2023 | Baskett | ...................... F41J 5/10 |
| 2015/0226509 A1* | 8/2015 | Hadler | ................... F41A 33/06 434/18 |
| 2015/0369554 A1* | 12/2015 | Kramer | .................. H04N 9/806 386/227 |
| 2017/0284754 A1* | 10/2017 | Chakraborty | ......... F41A 17/066 |
| 2017/0292813 A1* | 10/2017 | Speith | ................... F41G 3/2655 |
| 2019/0301833 A1* | 10/2019 | Campbell | ............... F41C 27/00 |

* cited by examiner

*Primary Examiner* — Lindsay J Uhl

(74) *Attorney, Agent, or Firm* — Brennan, Manna & Diamond, LLC

(57) ABSTRACT

A firearm front sight post that is comprised of a camera assembly which captures an image or video, or a series of images or videos of what is in front of the firearm at the instant that the firearm is first fired, and at the instant that each and every subsequent shot is fired. The camera assembly is actuated by a actuation mechanism in communication with the trigger assembly of the firearm, and is activated when the trigger wall is met in the act of pulling the trigger of a firearm. The system is also comprised of a wireless transmitter that automatically sends the image/video from the camera assembly to a mobile application on a smartphone or other smart device, wherein the images/videos are encrypted, time-stamped and dated.

13 Claims, 5 Drawing Sheets

SIGHT POST CAMERA FOR A FIREARM

CROSS-REFERENCE TO RELATED APPLICATION

The present application claims priority to and the benefit U.S. patent application Ser. No. 16/869,938, which was filed on May 8, 2020, and claims priority to U.S. Provisional Application No. 62/924,994 filed on Oct. 23, 2019, both of which are incorporated herein by reference in its entirety.

BACKGROUND

The present invention relates generally to a new and improved firearm front sight post camera system. More specifically, the invention relates to a firearm front sight post that is comprised of a camera assembly or mechanism which captures an image or video, or a series of images or videos of what is in front of the firearm (e.g., a suspect in a police chase) at the instant (and just before the instant) that the firearm is first fired, and at the instant that each and every subsequent shot is fired. The camera mechanism is actuated by a mechanical or electrical connection to the trigger assembly of the firearm, and is activated when the trigger wall is met in the act of pulling the trigger of a firearm. The firearm/camera system is also comprised of a wireless transmitter, such as a Bluetooth transmitter, that automatically sends the image/video from the camera assembly to a mobile application on a smartphone or other smart device, wherein the images/videos are encrypted, time-stamped and dated, and a global positioning system (GPS) for identifying the location of the firearm at the time of its discharge. Accordingly, the present specification makes specific reference thereto. However, it is to be appreciated that aspects of the present invention are also equally amenable to other like applications, devices and methods of manufacture.

Officer involved shootings have become common place in today's society, with many instances of the former making national headlines. During media coverage, many members of the media and/or society oftentimes cast doubt on the motives or thought process of the officer involved in the shooting incident, particularly if reports indicate that the suspect who was shot was, or appeared to be, unarmed, a minority, or not resisting arrest. To help mitigate these doubts and resolve such questions, as well as being used as a tool to ensure accountability of every officer and/or first responder, many law enforcement agencies have mandated the use of body worn cameras by their members. Such body cameras are typically worn by officers at all times while on duty, and may be attached to their uniform (e.g., in the chest or shoulder area) or worn while integrated into a pair of eyeglasses. Such body cameras are typically required by each agency to be turned on at all times in an effort to show with fully transparency the entire timeline of events that led up to the point of an officer involved shooting, as well as the actions of the officer(s) during and after the shooting.

Although body cameras are effective in providing a broader context of all factors/conditions that may have been present in a situation which ultimately resulted in an officer involved shooting, such body cameras have a plurality of inherent limitations. For example, the body camera may be turned off by the officer (intentionally or inadvertently), or may otherwise be incapable of precisely pinpointing the exact instant in which an officer elected to fire his or her weapon. In order to justify the use of deadly force, an officer may have to subsequently prove in a court of law that his or her actions were justified because, for example, the suspect behaved in a certain manner (e.g., the suspect reaching into his or her pocket while being told by the officer to put his or her hands up).

In a situation like the one described above, the precise timing of the events that occur in a deadly force encounter are of utmost importance, and it is in such an event where the limitations of a body worn camera can become fully apparent. For example, an officer involved in a deadly force encounter may state that he or she began to fire the weapon on a suspect when the suspect began to reach into his or her pocket, and that the officer believed that the suspect had a weapon or that the officer's life (or the life of another) was in imminent danger. In order to prove or disprove whether this was in fact the case, body camera footage may be admitted into evidence to justify or refute the officer's actions. However, body camera footage lacks the ability to consistently and precisely pinpoint the exact instant in which the officer began to fire his or her weapon on a suspect. Although body camera footage can be reviewed and a general consensus may be formed as to at what point in the encounter the officer fired upon the suspect (e.g., when the suspect began to reach for their pocket), the same cannot be determined with absolute certainty. This is due to the fact that any attempt to pinpoint the specific instant and conditions in which the shots were fired are based on an individual's subjective ability to visual estimate the precise instant in which the first bullet is discharged from the firearm of the officer on body camera video, and what the situational circumstances were at that instant.

Additionally, because most firearm rounds move at or above the speed of sound, it may be exceptionally difficult to discern from body cam footage the precise instant in which a bullet leaves the firearm of the officer. This task can be further hindered by the potentially low resolution of body cameras, which could make discerning the instant the bullet leaves the firearm infinitely more difficult in a trial setting. In addition to factors that include the speed of the bullet and camera quality of the body camera, the position of the body camera on the officer (e.g., on the chest or head area) may also hinder the ability to pinpoint the precise instant in which the firearm was discharged. This is due to the fact that the body camera may be fully or partially obstructed by a portion of the officer's body (e.g., the officer's arms while the firearm is drawn on the suspect) or the presence of cover that the officer may be behind when a shooting occurs, such as the door of a police vehicle, a rock, a tree, etc. When this occurs, the surrounding environment, including the suspect, may not be entirely visible in the body camera footage. Additionally, an officer's body camera could become dislodged or be aimed or directed at a different location than the suspect if the officer is required to, for example, give chase after the suspect, or is involved in a physical altercation with the same. The lack of clear and unobstructed body cam footage could significantly hinder any attempts to prove the guilt or innocence of an officer and whether the officer was justified in using deadly force in a given scenario.

Furthermore, any consensus that may be reached regarding the specific instant in which the firearm of an officer was discharged can ultimately be classified as subjective at best. This is true because the determination would likely only be made based on a visual estimation of when the bullet left the firearm and the subsequent situational conditions present during this instant, which may or may not be visible on the body cam footage for the reasons previously stated. Since the duration of an officer involved shooting is generally extremely short, potentially fatal decisions (e.g., the decision by the officer to discharge his or her weapon) must be made in a fraction of a second, with said decision being based on a situational condition that the officer believes that he or she is observing at the time (e.g., when the suspect began to reach for their pocket, possibly to produce a weapon). In order to fully justify the actions of an officer, these conditions must be adequately documented and readily available in an unaltered state for the potential viewing of a jury in a criminal or civil proceeding.

Therefore, there exists a long felt need in the art for an improved firearm front sight post camera system that allows the full situational conditions/context of a deadly force encounter to be fully and objectively documented at the exact instant that the firearm is discharged, and for every instant that the firearm is subsequently discharged, via high quality photographs/film. There also exists a long felt need in the art for an improved firearm front sight post camera system that requires no input from the user in order to be actuated, and that documents each instance in which the firearm is discharged on photograph/film. Finally, there exists a long felt need in the art for an improved firearm front sight post camera system that allows the documented photographs/film and related date (e.g., the location of the firearm at the time of its discharge) to be automatically and securely transferred to a mobile application on a smartphone or other smart device for record keeping or evidentiary purposes, preferably in an encrypted and unaltered manner.

The present invention in one exemplary embodiment, discloses an improved firearm front sight post camera system. More specifically, the firearm camera system is comprised of a front sight post having an integrated camera assembly that is in mechanical or electrical communication with the trigger mechanism of the firearm. The camera is aimed in the exact same direction as the bullet to be discharged from the firearm, and is automatically and simultaneously activated when the user engages the firearm trigger and it reaches the wall of the firearm trigger. The present invention is further comprised of a Bluetooth or other wireless transmitter that may be housed within the frame of the firearm, and that is also in electrical communication with the camera. The transmitter allows any video and/or photographic images recorded by the camera assembly and related data (e.g., GPS data about the location of the firearm) to be wirelessly transferred in an encrypted and time-stamped manner to an accompanying mobile application on a mobile phone or other smart device.

In this manner, the improved firearm front sight post camera system of the present invention accomplishes all of the forgoing objectives, thereby providing a consistently objective and unobstructed means to observe and discern nearly the precise instant that a firearm is discharged in a deadly force encounter, as well as the exact situational conditions/factors also present in said instant. In addition, the present invention will not interfere with the operation of the firearm, and requires no additional training/interaction from an officer/citizen to actuate and use. The sight post camera of the present invention provides a convenient and secured means for transferring captured images and/or video upon discharge of a firearm to a mobile phone or other smart device for record keeping purposes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a firearm front sight post camera system. More specifically, the firearm camera system is comprised of a traditional front sight post on a firearm, such as a handgun, pistol, shotgun, rifle, etc., and an integrated camera assembly. The camera assembly is connected via a mechanical or electrical connection to the trigger assembly of the firearm and an actuation mechanism, such that the camera is automatically actuated when a user pulls the trigger and the trigger reaches the trigger wall of the firearm, and just before the trigger breaks and the shot is fired from the firearm. In this instant, the camera may take a single photograph, a rapid burst of photographs, or a video, as specified by the user via a mobile application on a smartphone or other smart device.

More specifically, the camera assembly is also in electrical communication with a Bluetooth or other wireless transmitter that may be mounted within the frame of the firearm, for example, behind the recoil spring or at another suitable location. The wireless transmitter allows any images and/or video taken by the camera assembly and related data (e.g., GPS data about the location of the firearm) to be automatically transferred via, for example, an encrypted Bluetooth connection, to a mobile application on a mobile phone or other smart device for record keeping purposes. Each image/video is also automatically dated and timestamped when captured, up to the millisecond. While this application makes specific reference to a handgun throughout, it is also contemplated that the sight post camera system of the present invention can be applied to other types of firearms, such as rifles/carbines or shotguns in differing embodiments of the device, while maintaining the same general functional concept and architecture.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
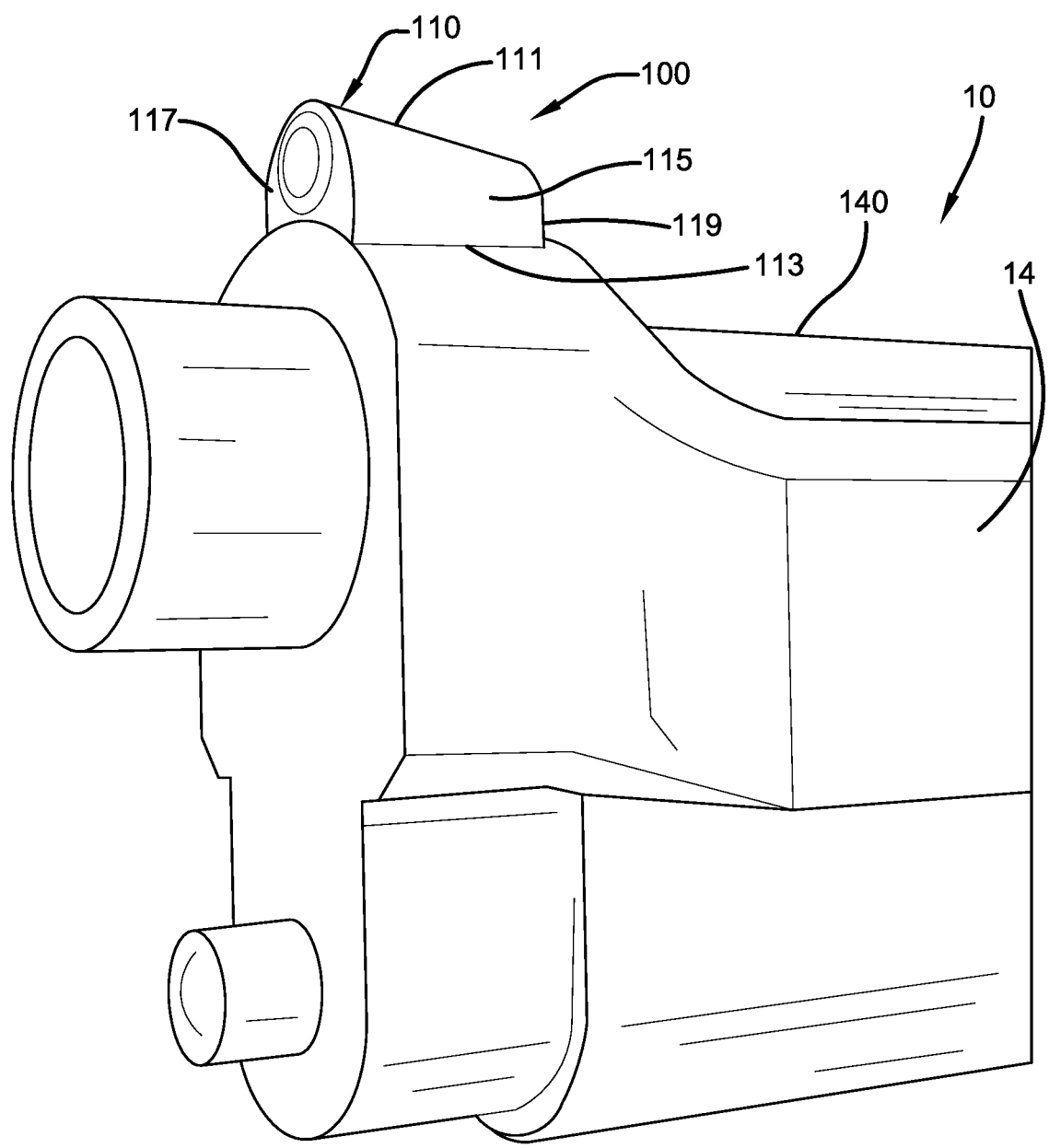
FIG. 1 illustrates a partial perspective view of one possible embodiment of the firearm front sight post camera system of the present invention mounted to a handgun in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists a long felt need in the art for an improved firearm front sight post camera system that allows the full situational conditions/context of a deadly force encounter to be fully and objectively documented and realized at the instant in which the firearm is discharged, and for every instant that the firearm is subsequently discharged thereafter via high quality photographs/film. There also exists a long felt need in the art for an improved firearm front sight post camera system that requires no input from the user in order to be actuated, and that documents each instance in which the firearm is discharged. Finally, there exists a long felt need in the art for an improved firearm front sight post camera system that allows the photographs/film/data documented to easily be transferred to a mobile phone or other smart device for record keeping or evidence purposes, preferably in an encrypted manner.

The present invention in one embodiment can take the form of a standard front sight post of a pistol or handgun and having a camera assembly integrated therein. The camera assembly is automatically activated via an actuation mechanism in mechanical or electrical connection with the trigger of the firearm. More specifically, the camera assembly is only activated during the pulling of the trigger of the firearm, and specifically when the trigger wall has been reached just prior to discharge of the firearm. By way of background, the trigger wall is defined within the firearm industry as the point where the trigger action first engages the resistance of the sear. At this point, the trigger has been squeezed and has moved, but the firearm has not yet been fired. Once the trigger wall has been reached, a user must increase the amount of pulling force on the trigger via the user's trigger finger to overcome the resistance and fire the weapon. Between the trigger wall being met and the trigger being fully pulled, the camera is activated via a mechanical connection between the camera and trigger assembly and begins to take, for example, a rapid burst of images, a single image, or a video, with all options being configurable by the user in the settings of the mobile application that is in communication with the camera assembly. Additionally, the camera assembly is further comprised of a Bluetooth or other wireless transmitter and GPS unit that is mounted within the frame of the pistol or handgun. The transmitter is preferably in electrical communication with the camera assembly, and allows the images/videos from the camera and GPS data to be automatically transmitted in a secure, encrypted, and time-stamped manner to the mobile application, which can run on a mobile phone or other smart device.

Figure 3B:
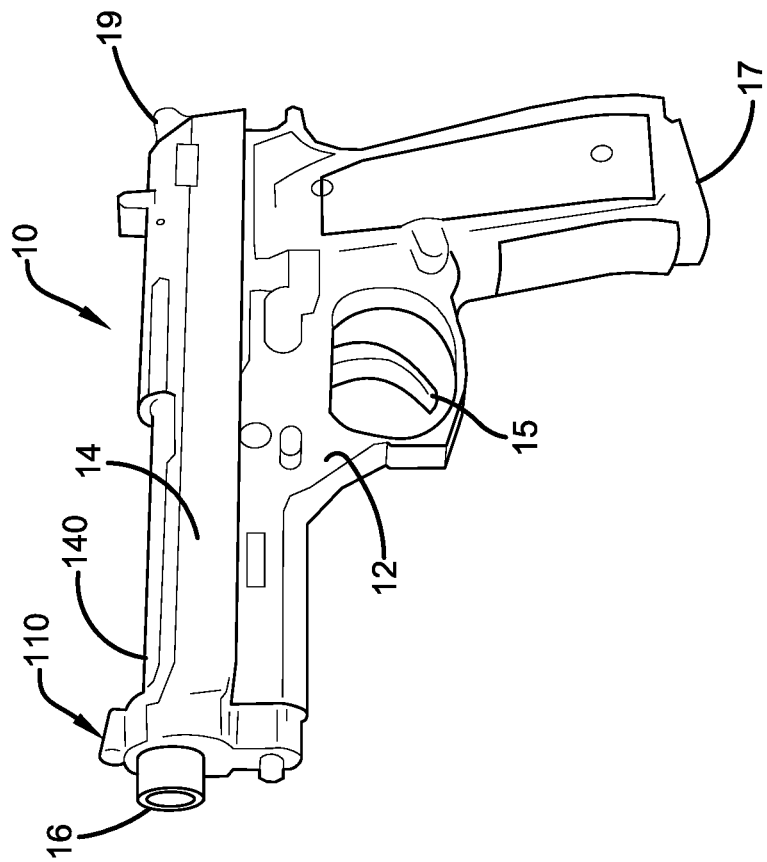
FIG. 3B illustrates a perspective view of one possible embodiment of the firearm front sight post camera system of the present invention integrated into a handgun in accordance with the disclosed architecture.
Figure 4:
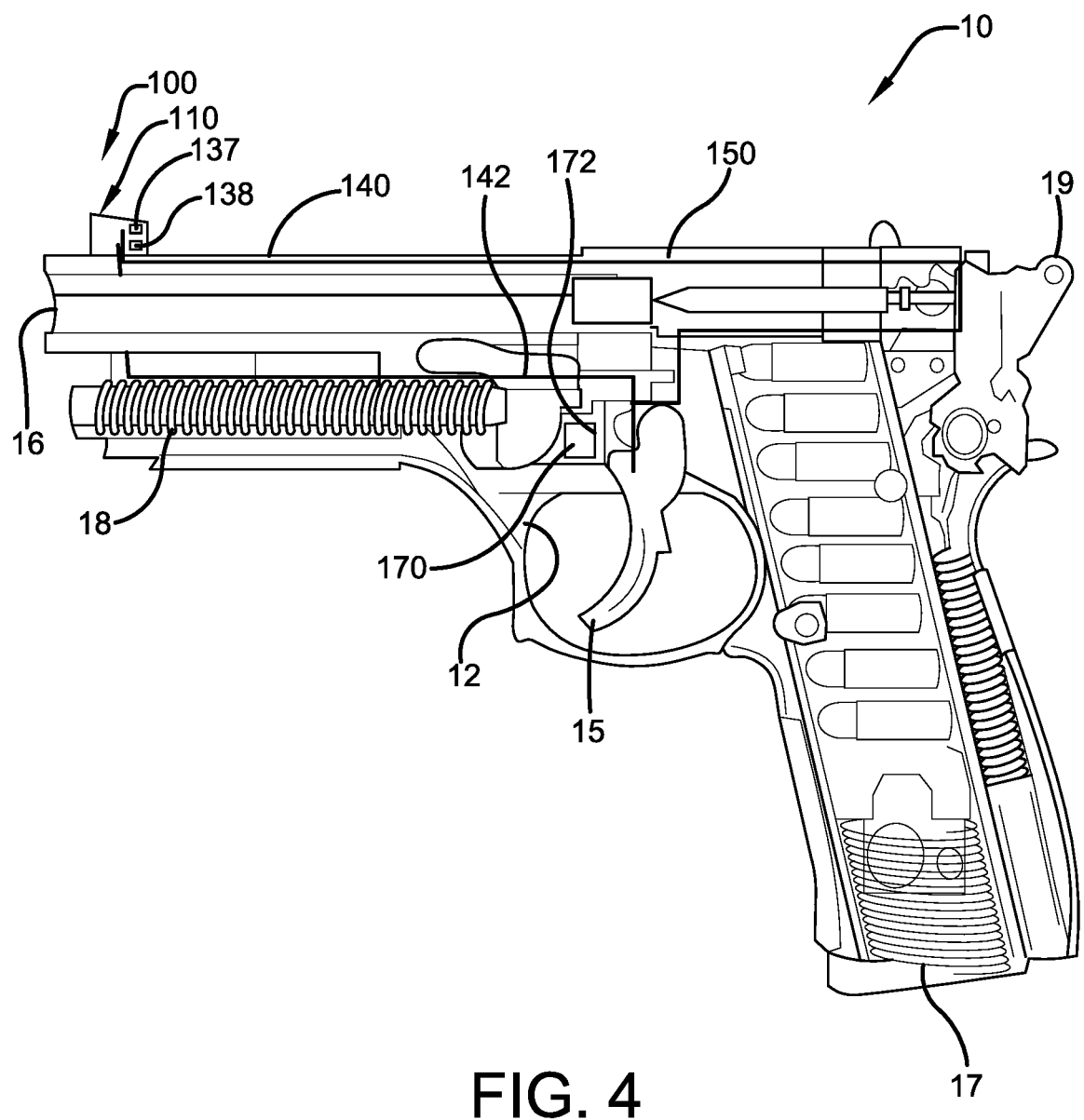
FIG. 4 illustrates a cross-sectional perspective view of one embodiment of the firearm front sight post camera system of the present invention mounted to a handgun in accordance with the disclosed architecture.

Referring initially to the drawings, FIG. 1 illustrates a perspective view of one possible embodiment of the firearm front sight post camera system 100 of the present invention mounted to a firearm 10. By way of background, and as best illustrated in FIGS. 3B and 4, firearm 10 may be any type of firearm currently known in the art such as a handgun, pistol, rifle, shotgun, etc., but is preferably a handgun, such as the type typically issued to law enforcement officers. Generally stated, handgun 10 is comprised of a frame 12, a slide assembly 14 having a top surface 140, a trigger assembly 15, a barrel 16, a spring loaded ammunition clip 17, a recoil spring 18 and a hammer 19, all of which function as is known in the art.

The sight post camera system 100 of the present invention is preferably comprised of a front sight post 110, a camera assembly 130, and a transmitter 170. Front sight post 110 is preferably identical in form and dimensions to traditional front sight posts, and is generally cylindrical is shape and comprised of a top surface 111, a bottom surface 113, opposing sides surfaces 115, a front 117 and rear 119. Front sight post 110 may be mounted to the top surface 140 of the slide assembly 14 of handgun 10 in a similar fashion as those front sight posts of the prior art, provided that both the front sight post and the top surface 140 of slide assembly have openings therein (not shown) to accommodate the mechanical or electrical interaction (e.g., wiring 150) between trigger assembly 15 and camera assembly 130, as explained more fully below. Further, the rear 119 of the front sight post 110 is preferably identical in appearance to a traditional front sight post, thereby not eliminating the ability for the front sight post 110 to function as intended, and allowing a user to more successfully aim and fire the handgun 10.

Figure 2:
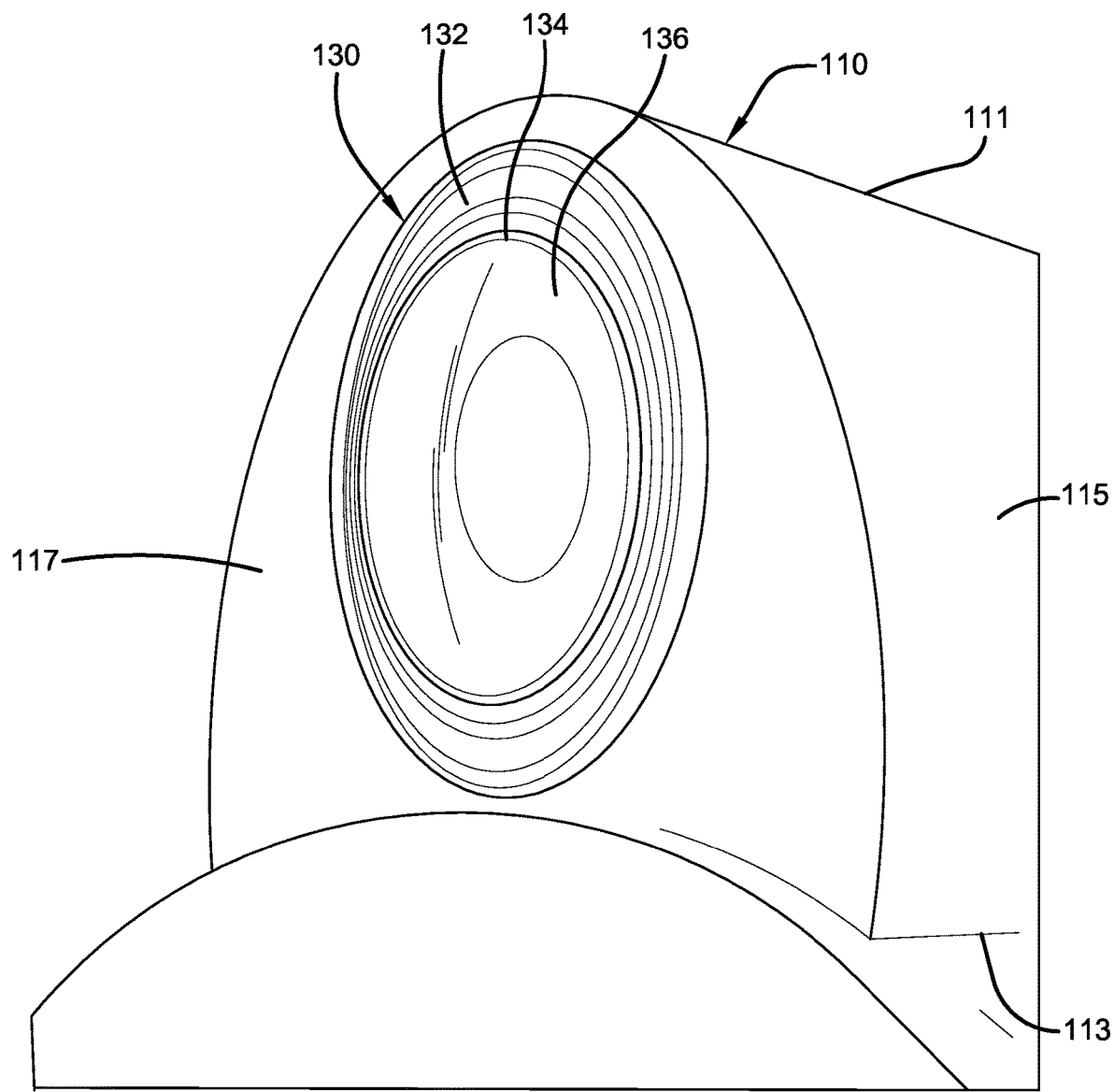
FIG. 2 illustrates a close up perspective view of the embodiment of the firearm front sight post camera system depicted in FIG. 1, and in accordance with the disclosed architecture.

As best shown in FIG. 2, the front surface 117 of the front sight post 110 is further comprised of an opening therein to accommodate camera assembly or system 130. The camera system 130 is preferably comprised of a protective bezel 132, a protective outer lens 134, and a camera lens 136, but may also be comprised of a memory 137 and a processor 138. Camera system 130 is preferably secured to, and may extend slightly beyond, the front surface 117 via protective bezel 132, which is also integrally comprised of protective outer lens 134. More specifically, the protective bezel 132 protects the camera system 130 from becoming dislodged from the front sight post 110 during firing of the handgun 10 and the recoil associated therewith, and the protective outer lens 134 protects the camera 130 from being covered with gunshot powder and/or residue. It is further contemplated that the protective outer lens 134 may be further comprised of a gunshot powder/residue resistant coating that is integrally formed to the lens 134 during the manufacturing process, with said coating inhibiting any and all potential build-up of gun powder residue on the surface of the protective outer lens 134, thereby ensuring that the camera system 130 has an unobstructed view of the events unfolding before it, particularly at the moment of firearm discharge.

The inner camera lens 136 functions as the main lens for the camera 130, and is similar to those camera lens of the prior art. Further, camera system 130, once activated, is capable of capturing photos and/or video, as preselected by the user via a mobile application 32 on a smart phone or other device, as is described more fully below. Memory 137 may be any form of memory device known in the art for receiving and storing data such as, but not limited to, the photos and/or video captured by the camera system 130, time and date information, the identity of the user of the handgun 10, etc. Likewise, processor 138 may be any known processor for processing data and/or instructions including, for example and without limitation, those commands that may be received from the mobile application 32 on smart device 30.

Figure 3A:
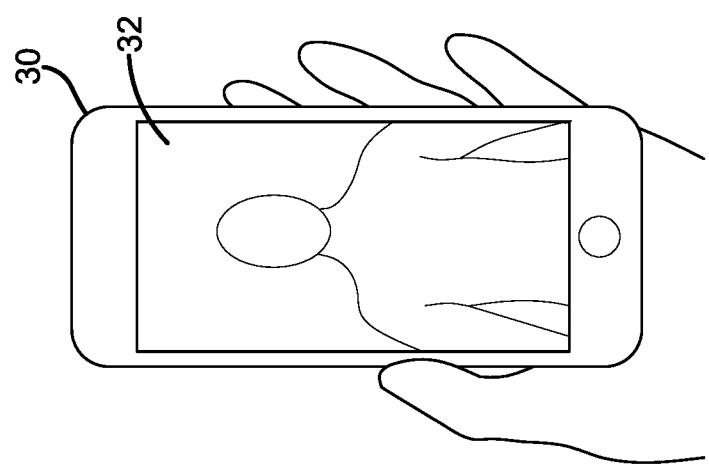
FIG. 3A illustrates a perspective view of one possible embodiment of a mobile application on a smartphone displaying a photograph taken by the firearm front sight post camera system of the present invention in accordance with the disclosed architecture.

FIG. 3A illustrates a perspective view of one possible embodiment of a smart device 30 having a mobile application 32 for displaying a photograph, video and/or data taken or gathered by the firearm front sight post camera system 100 of the present invention in accordance with the disclosed architecture. More specifically, the mobile application 32 may be comprised of a plurality of features that includes, without limitation, the ability to allow the user to change the specific type of recording that takes place by camera system 130. For example, the user (not shown) may select between a singular photo, a rapid burst of photos, or a video, all of which are actuated by each pull of the trigger assembly 15 of handgun 10, as will be explained in greater detail below. The mobile application 32 may also provide a means to transfer images/video/data from the camera assembly 130 or the memory 137 to the smart device 30, which may be a smart phone, a computer, or any smart device of the like, by, for example a wireless Bluetooth connection. More specifically, the mobile application 32 may connect to a Bluetooth or other wireless transmitter 170 having an antenna 172 that may be stored in the frame 12 of the handgun 10, wherein the transmitter 170 is further connected to the camera 130. Once connected via Bluetooth or other wireless technology to the transmitter 170, the mobile application 32 of smart device 30 will be able to receive the images/videos/data from the sight post camera system 100, preferably in an encrypted and secure connection and with each image/video being time-stamped with the date and time (in hours/minutes/seconds/milliseconds). This secure and encrypted connection ensures that the images/videos from the sight post camera system 100 cannot be hacked and/or subsequentially altered by the user or a third party. It is also contemplated that the captured images/videos/data could be transferred elsewhere, such as to law enforcement, internal affairs, the FBI, etc.

FIG. 3B illustrates a perspective view of one possible embodiment of the firearm front sight post camera system 100 of the present invention integrated into a handgun in accordance with the disclosed architecture, wherein the sight camera system 100 is integrated into a front sight post 110 of a handgun 10. As described above, handgun 10 is comprised of frame 12, slide assembly 14, trigger assembly 15 for actuating camera system 130 via actuation mechanism 142, barrel 16, spring loaded ammunition clip 17, recoil spring 18 and hammer 19.

FIG. 4 illustrates a cross-sectional view of one embodiment of the front sight post camera system 100 of the present invention mounted to a handgun 10 while also displaying how the camera assembly 130 of the sight post system 100 interacts with the trigger assembly 16 of the handgun 10. More specifically, the camera assembly 130 is automatically actuated by the pulling of the trigger 15, when said trigger 15 reaches the point of the trigger wall. Once the trigger wall has been reached, the actuation mechanism 142, which may be in the form of a sensor, a mechanical connection or electrical connection (e.g., via wiring 150), activates the camera 130 which will, in turn, automatically capture whatever form of images/video the user has selected via the mobile application 32 in the instant before the handgun 10 is fired. The actuation mechanism 142 thereby provides an accurate and objective image/video of what was observed by the user of the handgun 10 as he or she begins to fire the weapon. In addition, the actuation mechanism 142 repeatedly activates the camera assembly 130 for every trigger pull thereafter, thereby allowing for the conditions/factors present before/during each shot to be accounted for and documented in memory 137 and/or smart device 30.

FIG. 4 also displays the path of the electrical connection 150 that connects the camera 130 to the Bluetooth transmitter 170, which is preferably positioned behind/near the recoil spring 18 of the handgun 10, or at another convenient location. More specifically, it is contemplated that wiring 150 may run from the trigger 15 to the actuation mechanism 142 to the camera 130 (and its processor) and then to the transmitter 170, all of which may be powered by a microbattery (e.g., watch, cell-phone or hearing aid battery) that may be wired or wirelessly rechargeable. The Bluetooth transmitter 170 may also double as a GPS unit that is capable of recording the location of firearm 10 at the moment of its discharge, and transmitting such data along with the photos or videos captured by the camera 130 to the mobile application 32 on smart device 30, or to a third party such as law enforcement, internal affairs, the FBI, etc.

Figure 5:
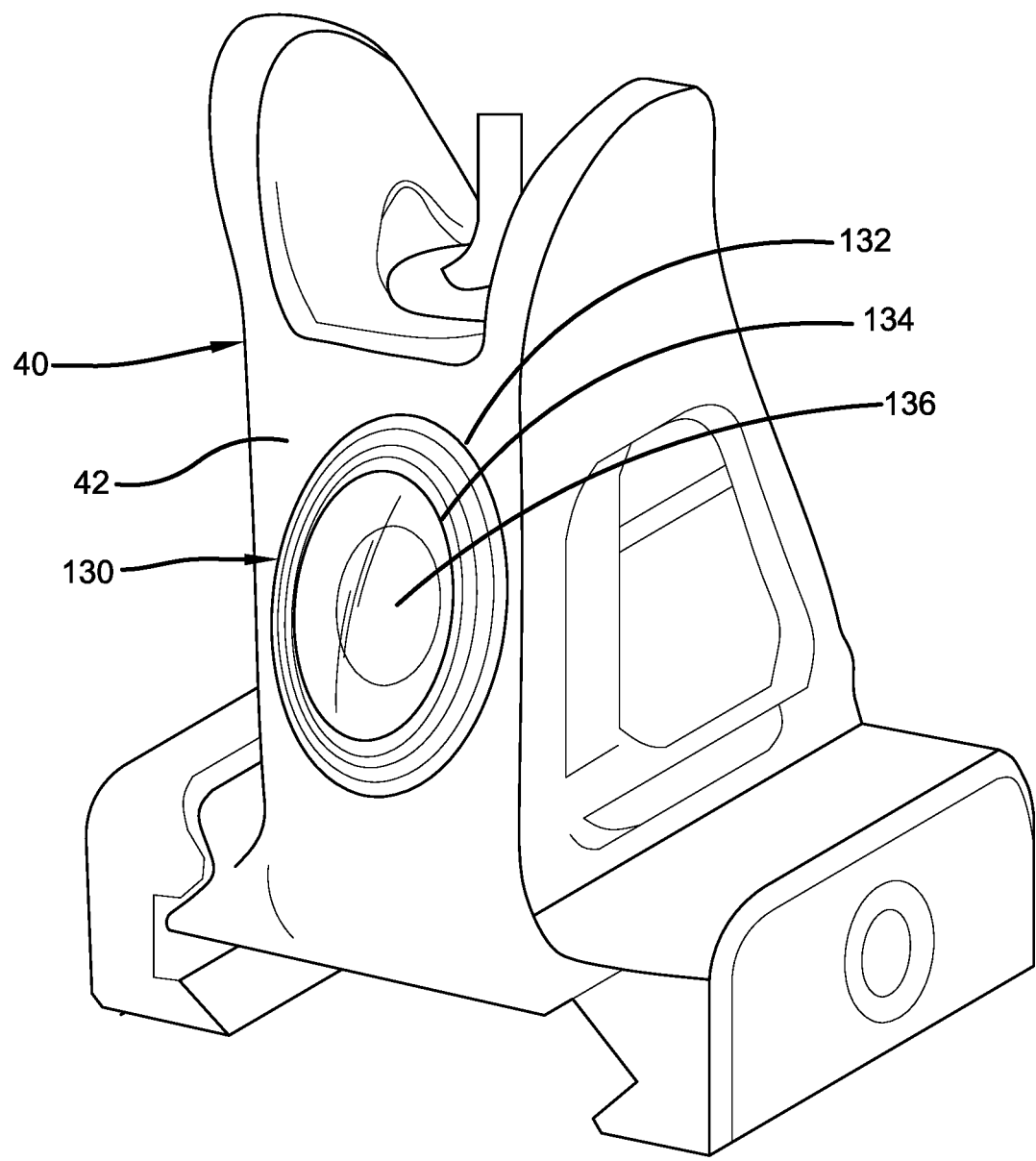
FIG. 5 illustrates a perspective view of an alternative embodiment of the firearm front sight post camera system of the present invention in the form of a rifle/carbine style sight in accordance with the disclosed architecture.

FIG. 5 illustrates a perspective view of an alternative embodiment of the firearm front sight post camera system 100 of the present invention in the form of a rifle/carbine style sight in accordance with the disclosed architecture. More specifically, it is contemplated that the front sight post camera system 100 may be adapted in differing embodiments to be used in conjunction with other firearm front sight posts. Said front sight posts may include, without limitation, the A2 front sight post 40 of an AR-15, which is the typical duty rifle used by a wide variety of law enforcement agencies. In this embodiment, all aspects of the sight post camera system 100 and its function are the same as described above, with the camera 130 being mounted in the front surface 42 of the A2 front sight post 40. More specifically, this embodiment of the sight post camera system 100 is comprised of all elements of the former embodiment, namely: (a) a camera 130 that is further comprised of protective bezel 132, protective outer lens 134, and camera lens 136; (b) a mechanical camera actuation mechanism 142 that is connected to both the camera 130 of the A2 front sight post 40, as well as the trigger of the rifle/carbine (not shown) and is activated once the trigger reaches the trigger wall each and every time that the trigger is pulled; and (c) an electrical communication 150 between the Bluetooth or other wireless transmitter 170 and camera 130 (not shown).

Notwithstanding the forgoing, the improved firearm front sight post system 100 can be any suitable size, shape, and configuration as is known in the art without affecting the overall concept of the invention, provided that it accomplishes the above stated objectives. One of ordinary skill in the art will appreciate that the shape and size of the system 100 and its various components, as shown in the FIGS. are for illustrative purposes only, and that many other shapes and sizes of the system 100 are well within the scope of the present disclosure. Although dimensions of the system 100 and its components (i.e., length, width, and height) are important design parameters for good performance, the system 100 and may be any shape or size that ensures optimal performance during use and/or that suits user need and/or preference. This includes the shape/type of front sight post 110, which may differ in differing embodiments of the system 100 as required by the firearm that the system 100 is being used in conjunction with.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A front sight post camera system for a firearm having a trigger, wherein the front sight post camera system comprises:
   a front sight post;
   a camera assembly integrated into the front sight post;
   an actuation mechanism in communication with the trigger and the camera assembly, wherein the actuation mechanism activates the camera assembly each time the trigger is pulled;
   a wireless transmitter; and
   wherein the camera assembly comprises an inner camera lens and a protective bezel extending beyond a front surface of the front sight post and comprising an outer lens.

2. The front sight post camera system of claim 1, wherein the wireless transmitter is housed in a frame of the firearm.

3. The front sight post camera system of claim 1, wherein the wireless transmitter wirelessly transmits an image taken by the camera assembly to a remote device.

4. The front sight post camera system of claim 3, wherein the wireless transmission of the image taken by the camera assembly to the remote device is encrypted.

5. The front sight post camera system of claim 3, wherein the image taken by the camera assembly is date and time stamped.

6. The front sight post camera system of claim 1 further comprising a memory and a processor.

7. The front sight post camera system of claim 1, wherein the actuation mechanism is a sensor that is wired to the camera assembly.

8. The front sight post camera system of claim 1, wherein the wireless transmitter further comprises an antenna.

9. The front sight post camera system of claim 1, wherein the camera assembly is capable of operating in more than one mode.

10. The front sight post camera system of claim 9, wherein the mode of operation of the camera assembly is controlled by a mobile application on a smart device.

11. The front sight post camera system of claim 9, wherein the mode of operation is a selectable one of: (a) a single photo; (b) a burst of photos; and (c) a video.

12. A front sight post camera system for a firearm having a trigger, wherein the front sight post camera system comprises:
   a front sight post;
   a camera assembly integrated into the front sight post;
   an actuation mechanism;
   a wirelessly rechargeable wireless transmitter;
   a GPS unit; and
   a mobile application for installation on a remote smart device, wherein the actuation mechanism activates the camera assembly to produce an image each time the trigger is pulled and the wireless transmitter automatically sends the image to the smart device; and
   wherein the camera assembly comprises an inner camera lens and a protective bezel extending beyond a front surface of the front sight post and comprising an outer lens comprising an integrally formed powder resistant coating.

13. The front sight post camera system of claim 12, wherein the transmission of the image taken by the camera assembly to the remote device is encrypted and the image is date and time stamped.

* * * * *